US006573845B2

(12) United States Patent
Pozidis

(10) Patent No.: US 6,573,845 B2
(45) Date of Patent: Jun. 3, 2003

(54) METHOD FOR CONVERTING AN ANALOGUE SIGNAL INTO A BINARY OUTPUT SIGNAL

(75) Inventor: Charalampos Pozidis, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 32 days.

(21) Appl. No.: 09/936,708

(22) PCT Filed: Jan. 10, 2001

(86) PCT No.: PCT/EP01/00196
§ 371 (c)(1),
(2), (4) Date: Sep. 14, 2001

(87) PCT Pub. No.: WO01/52256
PCT Pub. Date: Jul. 19, 2001

(65) Prior Publication Data
US 2003/0067403 A1 Apr. 10, 2003

(30) Foreign Application Priority Data

Jan. 14, 2000 (EP) .............................. 00200158

(51) Int. Cl.[7] ................................................ H03M 7/00
(52) U.S. Cl. ...................... 341/59; 341/155; 704/200.1
(58) Field of Search .......................... 341/59, 55, 155, 341/158, 94; 704/200.1; 708/422; 360/65

(56) References Cited

U.S. PATENT DOCUMENTS 6,011,496 A * 1/2000 Park et al. .................... 341/55
6,069,913 A * 5/2000 Suominen .................... 375/147
6,246,346 B1 * 6/2001 Cloke et al. .................. 341/59

OTHER PUBLICATIONS

A Low Complexity and High Speed Detection Method for High Density d=1 Optical Recording, By C. Pozidis et al., IEEE Transactions on Consumer Electronics, vol. 26, No. 3, Aug. 2000 XP–002168740.

* cited by examiner

Primary Examiner—Jean Bruner Jeanglaude
(74) Attorney, Agent, or Firm—Laurie E. Gathman

(57) ABSTRACT

A method for converting an analogue signal representing a runlength limited binary signal with runs of length of at least N into a binary output signal. The analogue signal is sampled and an intermediary binary signal is generated based on the sample analogue signal. Those binary sequences within the intermediary binary signal having a length greater than 2N−1 are identified. The sequences having a set of successive samples having the same binary value, and which borders on samples having an opposite binary value. For each such binary sequence, an analogue sequence is selected in the sampled analogue input signal which corresponds to the identified binary sequence. Then it is determined if there are a plurality of significant local extrema within the selected analogue sequence, and if they are found, the identified binary sequence is partitioned into a corresponding plurality of smaller runs, comprising at least one run of length N.

9 Claims, 8 Drawing Sheets

US 6,573,845 B2

METHOD FOR CONVERTING AN ANALOGUE SIGNAL INTO A BINARY OUTPUT SIGNAL

BACKGROUND OF THE INVENTION

The present invention relates to a method for converting an analogue signal representing a runlength limited binary signal with runs having a length of at least N into a binary output signal.

n a d=1 RLL code the shortest allowable runlength is an I2 (two equal 2N−1consecutive binary symbols), translating to a (highest) frequency component of 1/4T, where 1/T is the channel bit rate. The physical length of a channel bit on the disc is chosen in such a way as to ensure that the highest frequency allowed by the code is still lower than the cut-off frequency of the optical channel (determined from the parameters of the optical pick-up). This provision ensures that the smallest marks (pits or lands) will be resolved during disc read-out. However, in order to achieve the aimed capacity of around 25 GB in DVR, the recording density is increased. This translates to smaller marks on the disc, the resolution of which becomes increasingly difficult. The same phenomenon is observed when the writing speed is increased; this leads to transition shifts (writing jitter) in the opposite direction for rising and falling edges of small runlengths on the disc. This again results in the shortening of small runlengths.

A direct consequence of density and/or writing speed increases is the fact that traditional techniques for data detection, such as threshold detection, fail to achieve adequate performance. Even more sophisticated detection methods, such as Runlength Pushback detection as described in EP 948844 A1, suffer significant performance losses at the high capacities aimed for DVR. The obvious solution to the problem is to resort to Maximum Likelihood Sequence Detection (MLSD) techniques, which are known to achieve optimum performance under certain conditions. MLSD techniques indeed seem to do the job, and exhibit significant robustness with respect to density increases. However, their enhanced performance comes at the price of bit-recursive operation, a fact which may prohibit their implementation at the very high data rates that are likely to emerge.

SUMMARY OF THE INVENTION

It is an object of the invention to provide a method which has a performance comparable to that of MLSD methods, but which avoids bit-recursive operation. In order to achieve this object the method according to the invention for converting an analogue signal representing a runlength limited binary signal with runs having a length of at least N into a binary output signal comprises the following steps:

a. sampling the analogue signal, b. generating an intermediary binary signal on the basis of the sampled analogue signal, c. identifying binary sequences within the intermediary binary signal having a length greater than 2N−1, the sequences comprising a set of successive samples having the same binary value, and which set borders on samples having an opposite binary value and for each such binary sequence, d. selecting an analogue sequence in the sampled analogue input signal which corresponds to the identified binary sequence, e. searching for the existence of a plurality of significant local extrema within the selected analogue sequence, f. if such a plurality of significant local extrema is found partitioning the identified binary sequence into a corresponding plurality of smaller runs, comprising at least one run of length N.

The method according to the invention avoids recursive operations, but detects the binary signal with a relatively high accuracy. The latter is based on the following observations.

The proposed detection scheme is tailored to high capacity and/or high speed optical recording systems using a d=1 channel code, such as DVR RW. A study of the bit-errors that are usually encountered in such systems was first conducted. An analysis of the bit-errors left after application of (a modified version of) the run-detector of EP 948 844, that corrects only for violations of the d=1 constraint, revealed a single most important category of errors in the detected bit-stream. These errors occur by miss-detection of I2's in the HF signal. Both samples of these I2-runs are either not high (for an I2-land) or low (for an I2 pit) enough to cross the threshold level of the detector, and are therefore detected as parts of their surrounding runs (of opposite polarity). The result is that the two pits (lands) surrounding the I2 land (pit) are joined by the miss-detected I2, to form a longer combined run.

The problem of miss-detected I2s becomes more severe as recording density and/or recording speed is increased, and accounts for an increasing percentage of errors. An important observation from the performed experiments is that if all erroneous I2's can be detected and corrected, then near-MLSD performance can be achieved. It is therefore adequate, at least in terms of bit-errorrate performance, to concentrate only on this type of errors.

The proposed detection methodology is in particular suitable for the correction of a certain category of errors, which occur in high-density and/or high writing speed d=1 recording. Recently, other sub-optimal detectors have been introduced for ROM applications.

These detectors are in turn focused on the correction of errors occurring in ROM media, under DVD-like conditions. Since the sources of errors in ROM media are different from those encountered in the present case (d=1, DVR RW-like conditions), these detectors are not considered here.

BRIEF DESCRIPTION OF THE DRAWINGS

These and other aspects of the invention are discussed in more detail with reference to the drawing. Therein.

DETAILED DESCRIPTION OF THE INVENTION

Figure 1:
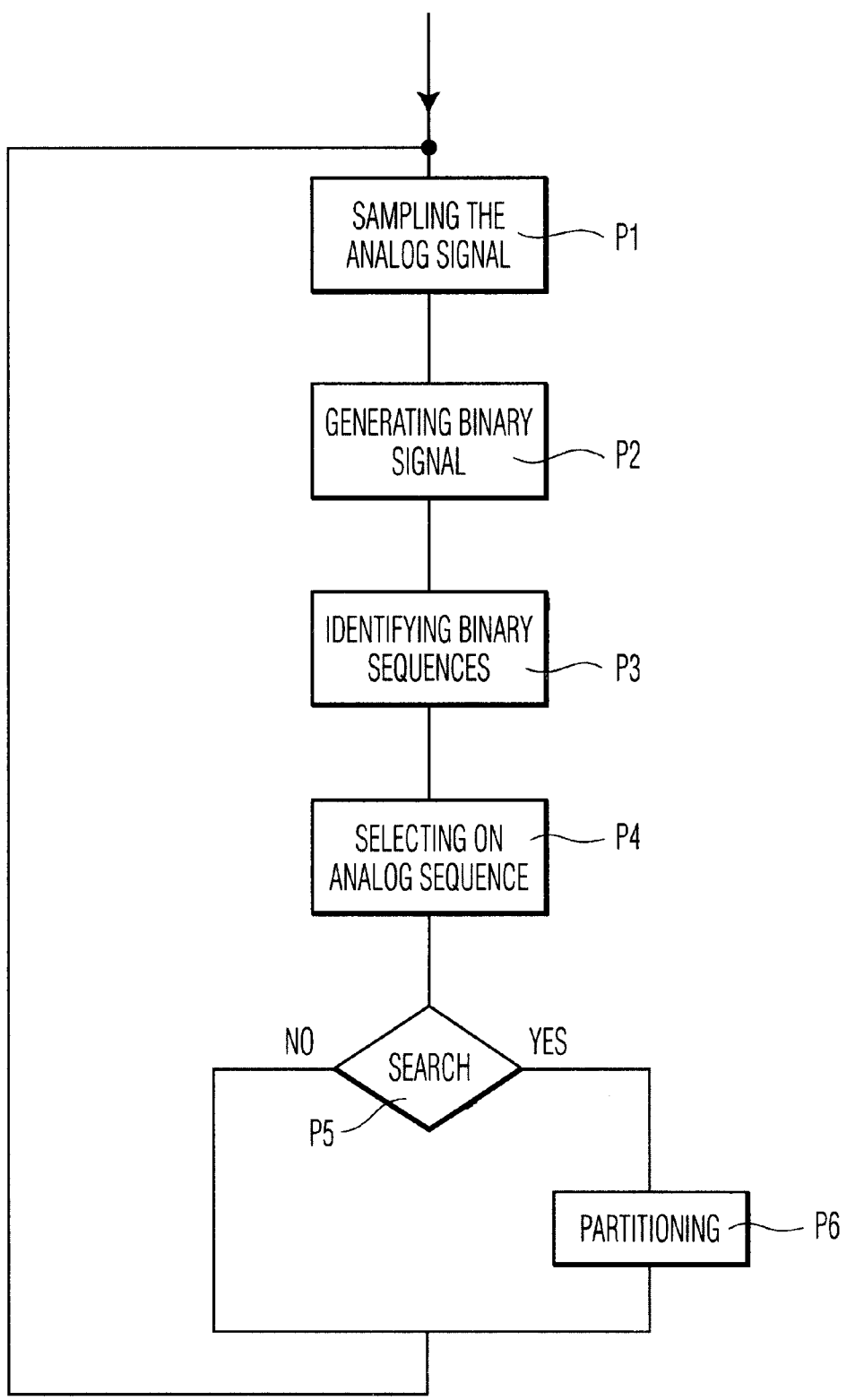
FIG. 1 is schematically illustrates the method according to the invention.

FIG. 1 schematically shows a method for converting an analogue signal representing a runlength limited binary signal with runs having a length of at least N into a binary output signal. The method according to the invention comprises the following steps:

a. sampling the analogue signal (P1),
b. generating an intermediary binary signal on the basis of the sampled analogue signal (P2),
c. identifying binary sequences within the intermediary binary signal having a length greater than 2N−1, the sequences comprising a set of successive samples having the same binary value, and which set borders on samples having an opposite binary value and for each such binary sequence (P3),
d. selecting an analogue sequence in the sampled analogue input signal which corresponds to the identified binary sequence (P4),
e. searching for the existence of a plurality of significant local extrema within the selected analogue sequence (P5),
f. if such a plurality of significant local extrema is found partitioning the identified binary sequence into a corresponding plurality of smaller runs, comprising at least one run of length N (P6).

Figure 2:
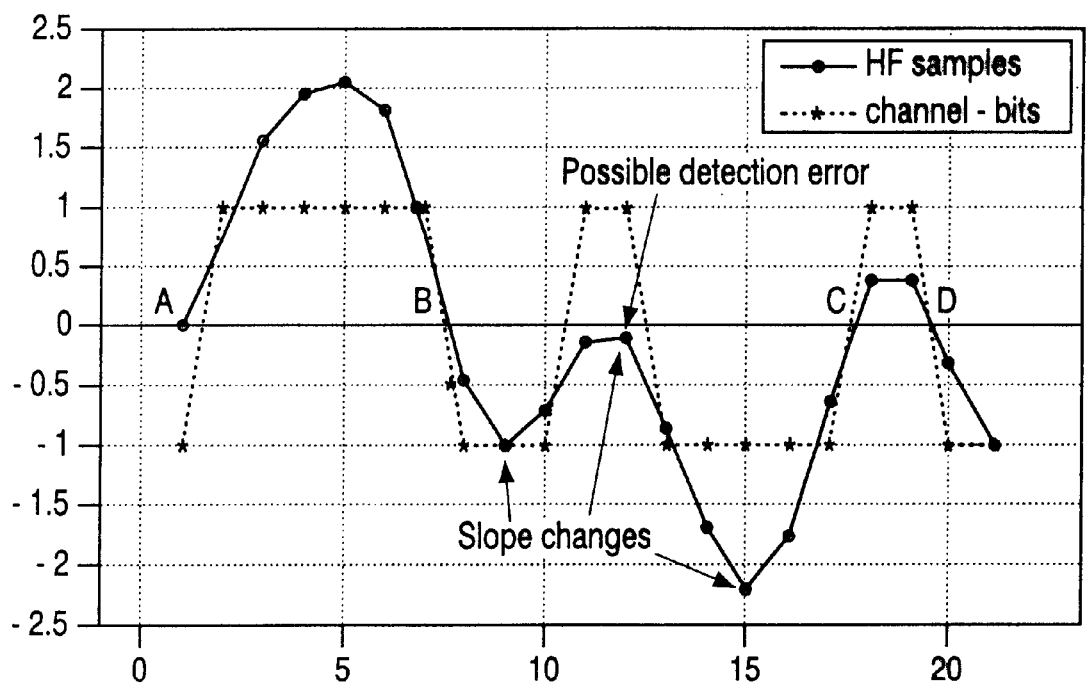
FIG. 2 shows a first analog signal representing a run of length 2 which is concealed within a sequence of 10 samples having the same polarity.

The key to the invention is the shape of the recorded domains (marks or non-marks, pits or lands) in the HF playback signal. The principles are clearly illustrated by a graphical example; FIG. 2 shows a snapshot of BF replay signal samples in circles, connected by a solid line to approximate the underlying continuous-time signal. Shown also are the corresponding actual channel bits (in stars), to indicate the positions of detection errors. The solid line at zero amplitude corresponds to the slicer level, and points A, B, C and D indicate the positions where the HF signal crosses the slicer level (zero crossings). Samples are numbered for reference. It is apparent that samples 11 and 12 will be (erroneously) detected as −1's by a binary slicer, which sees the samples numbered 8 up to 17 as a long pit of length 10 bit-intervals. However, it is quite obvious to the human observer that samples 11–12 correspond to an I2-land instead.

The key observation here is that runs that do not contain decision errors (such as the I6 land between points A and B) have a well-defined shape, in the sense that the continuous line connecting all samples in the run exhibits a unique extremum point. On the other hand, runs with decision errors (such as the I10-pit between B and C), exhibit multiple (local) extrema. In a somewhat general sense, the HF signal curve between A and B, together with the straight line segment AB, can be said to form a convex structure, while the I10-pit together with line BC forms a non-convex structure.

Figure 3:
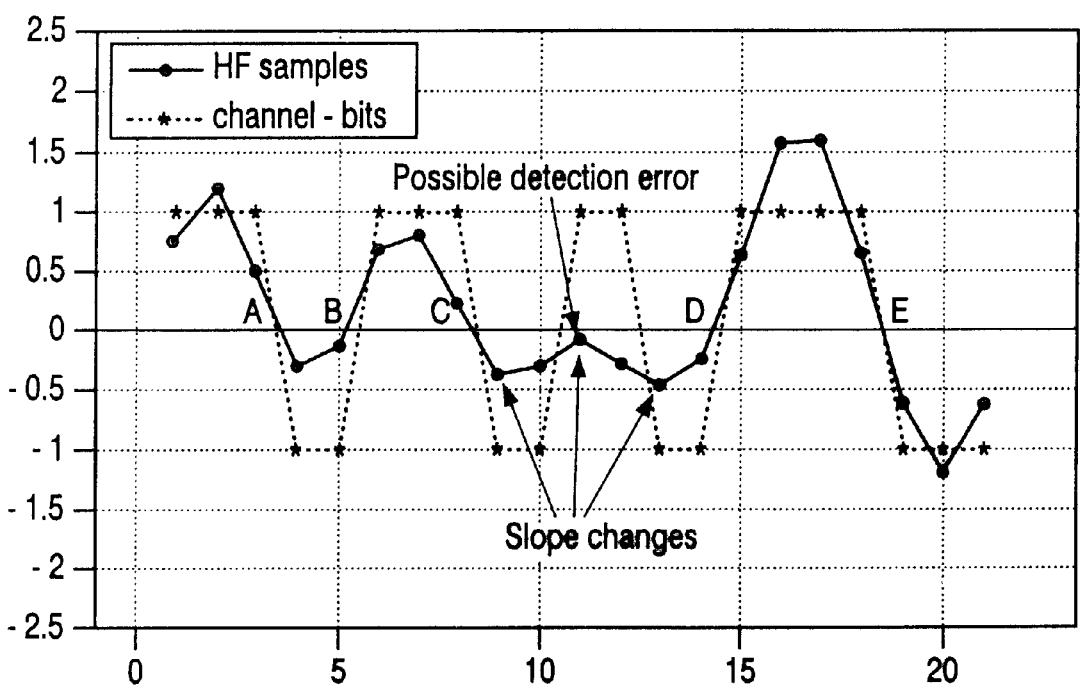
FIG. 3 shows a second analog signal representing a run of length 2 which is concealed within a sequence of 6 samples having the same polarity.

For comparison FIG. 3 shows an I2 run which is concealed in sequence of 6 samples.

As already mentioned, the methodology described here leaves a lot of room for specific embodiments of the detector or the detection method. Three embodiments are described in the following section and their performance is illustrated. They all belong to the "family" of detectors that follow the proposed methodology. It should be emphasised, however, that this short list of embodiments is by no means (and is not intended to be) complete. They are presented here for reference and performance evaluation.

In a first embodiment of the invention, the detector or method locates Possible "hidden" I2's by checking the number of local extrema in a long run (see sub-section 2.2). A practical way to locate local extrema in the HF signal is to search for slope changes. In practice the detector operates on samples of the HF signal. In that case, the slope of the linear segment between two consecutive samples is calculated by:

$$\text{slope}[k]=x[k]-x[k-1],$$

where x[k] stands for sample k of the HF signal. A slope change is then detected whenever sign(slope[k])≠sign(slope[k−1]). Note that only the sign of the slope is used.

The operation of the detector is again described in steps, in accordance to the methodology of the previous section. It is assumed that Step 1 of the methodology has been followed, so we start with Step 2.

Step 2:

Assume that a run of length L has been located. The L HF signal samples corresponding to this run, together with two extra samples, the one preceding and the one following the run, in total L+2 samples, are stored in a buffer for processing. The slopes of the L+1 line segments connecting the samples are calculated, and the number of slope changes is counted. It should be noted that only an odd number of slope changes is possible, due to the nature of the HF signal (an up-going transition is eventually followed by a down-going one, and vice-versa). If more than one slope changes are detected, an error flag is raised. In that case, the position of even-indexed slope changes (second, fourth and so on) is marked for error checking. For example, if sign(slope[k]) ≠sign(slope[k−1]), and this is an even-indexed slope change, then x[k−1] is marked for error checking.

Step 3:

The bit corresponding to sample x[k−1] is flipped only if |x[k−1]|<To, where To is a threshold value depending on the modulation in the eye-pattern. This constraint ensures that the slope change in the middle of a long run corresponds to an I2 and not to a bump due to noise or other effects (e.g. the characteristics of the equalizer). The closer the amplitude level of this bump is to the threshold level of the slicer, the higher the possibility that it corresponds to a miss-detected I2.

Step 4:

If the bit corresponding to an even-indexed slope change is flipped, say bit with index k, then one of its immediate neighbours (bit k +1 or k−1) has to be flipped also, in order to create a valid I2 run. The decision of which bit should be flipped is based on the amplitude of the samples corresponding to bits (k+1) and (k−1). The bit corresponding to the sample with the smaller absolute magnitude is flipped. There is one exception however: if flipping the bit in one direction creates an I1, then the bit in the opposite direction is flipped, irrespective of amplitude levels. This rule still leaves one undecided case, namely an I2-I1-I2 bit-pattern. In that case, flipping a bit in any direction creates an I1, an invalid runlength. Therefore two bits have to be dipped at once. If the index of the I1 bit in the middle is k, then either bits (k−3) and (k−1), or bits (k+1) and (k+3) are flipped at once, to create an I2-I2-I2 bit-pattern. The bits to be flipped are those that correspond to the samples with the smaller sum of absolute amplitude levels. So for example, if $$(|x[k-3]|+|x[k-1]|)<(|x[k+1]|+|k+$$

then bits (k−3) and (k−1) are flipped. It should be noted that, in the case of an I2-I1-I2 bit-pattern, it is assumed that no other I2's exist either to the immediate left or to the right of that bit-pattern. If any such I2 exists, then no action is performed and an I1 is left behind.

The idea behind the second embodiment is that the magnitudes of the samples of an I2 "hidden" in a longer run will be smaller than the rest of the samples of the long run, with the possible exception of the first and the last sample. This statement is intuitive since a "hidden" I2 actually corresponds to a pair of channel bits of opposite polarity relative to the surrounding bits. Assuming that Step 1 has been performed, the method according to this embodiment proceeds as follows.

Step 2:

Sort the samples of the long run, excluding the two outer-most ones, in ascending order of magnitude, and keep the three smallest ones. Denote these samples $x_0, x_1, x_2$. If the smallest (in magnitude) sample $(x_o)$ is less than a threshold To, then go to Step 3, otherwise return to Step 1 (sub-section 2.3).

Step 3:

Consider the following two cases:

Case 1: If $x_0, x_1, x_2$ are consecutive samples, then flip the bit corresponding to sample $x_0$. To create a valid d=1 bit-stream one of the immediate (left or right) neighbours of this bit must also be flipped. The last step of the method is then Step 4 of the method according to the first embodiment, described above. This case covers the situation of a single "hidden" I2 within a long run. Such an I2 will manifest itself as a single "bump" in the run where it appears. Then, with a high probability, $z_0$ lies in this bump, and thus is one of the two samples of the underlying I2.

Case 2: If: $x_0, x_1, x_2$ are not consecutive, then the bits corresponding to these samples are all flipped. This case corresponds to the situation of two "hidden" I2's within a long run. The three smallest samples will most probably belong to these two I2's. Since such I2's cannot be consecutive (at least another I2 separates them), not all three of $x_0,x_1,x_2$ will be consecutive. Moreover, with a high probability, two of $x_0, x_1, x_2$ belong to one of the I2's, and one of $x_0, x_1, x_2$ belongs to the other I2. Therefore, flipping all of the corresponding bits we most probably correct both bits of one I2, and one bit of the other I2. To fully correct the second I2, a step similar to Step 4 of the method according to the first embodiment is needed. The method is finished then.

It should be noted here that situations of runs containing two "hidden" I2's are not uncommon, especially when moving to higher densities and/or higher writing speeds. However, no runs with three "hidden" I2's have been encountered in any of the measurements.

The second embodiment is rather simpler than the first, yet their performance is almost identical as will be shown later. If we are willing to accept some performance loss, then a natural variant of the first two embodiments emerges, which beats the other two in terms of simplicity. As before, the description of the third embodiment starts with Step 2.

Step 2:

Determine all samples of the current runlength, excluding the two outer-most ones, with magnitude not exceeding a threshold To. Then flip the bits corresponding to all these samples. The role of To is to ensure that only "hidden" I2's are flipped, and no other bits. Choice of To can be based on the eye-pattern of the HF signal. A small To will result in missing some "hidden" I2's and/or correcting only one bit of such I2's. On the other hand, a large To can result in the miss-correction of bits not belonging to "hidden" I2's, unless other precautions are taken with impact on the complexity of the method. Assuming that a conservative choice for To is made (a rather small value), some I1's will probably be left behind. To correct for these, a final step similar to Step 4 of the method according to the first embodiment is followed.

The proposed detection methods, along with a Runlength Pushback detector for d=1 channel coding and a Viterbi detector with a 5-tap target response, were tested on experimentally derived playback files for performance comparison. The playback waveforms were obtained from DVR RW discs at three different densities. Recording was performed in land-groove (first in land, then in groove) with measurements done in groove, at optimal (absence of tilt) writing conditions. In fact there was no thermal cross-talk during writing, but only optical cross-talk during reading. At the playback side a blue laser with 405 nm wavelength was used, along with a lens with NA=0.85. The track pitch was 0.3 µm. The recording density was varied along the track by reducing the channel bit length from 90 to 83.7 to 81.1 nm, resulting to a disc capacity of 21.4, 23.0 and 23.8 GB respectively. To test the performance of the detectors at non-ideal conditions, playback was performed under varying degrees of tangential as well as radial tilt.

The detectors proposed here are compared to a Runlength Pushback detector (EP 948 844) and a PRML detector. The RPD detects and corrects only violations of the d=1 and k=7 RLL code constraints in the replay waveform, thus producing a code-compliant bit-stream. The PRML detector is a 5-tap Viterbi detector with reduced complexity for the outer states. It is equipped with inherent non-linearity handling, see EP 1 046 165 A1, by adaptive determination of its reference levels used in branch metric computations.

Figure 4:
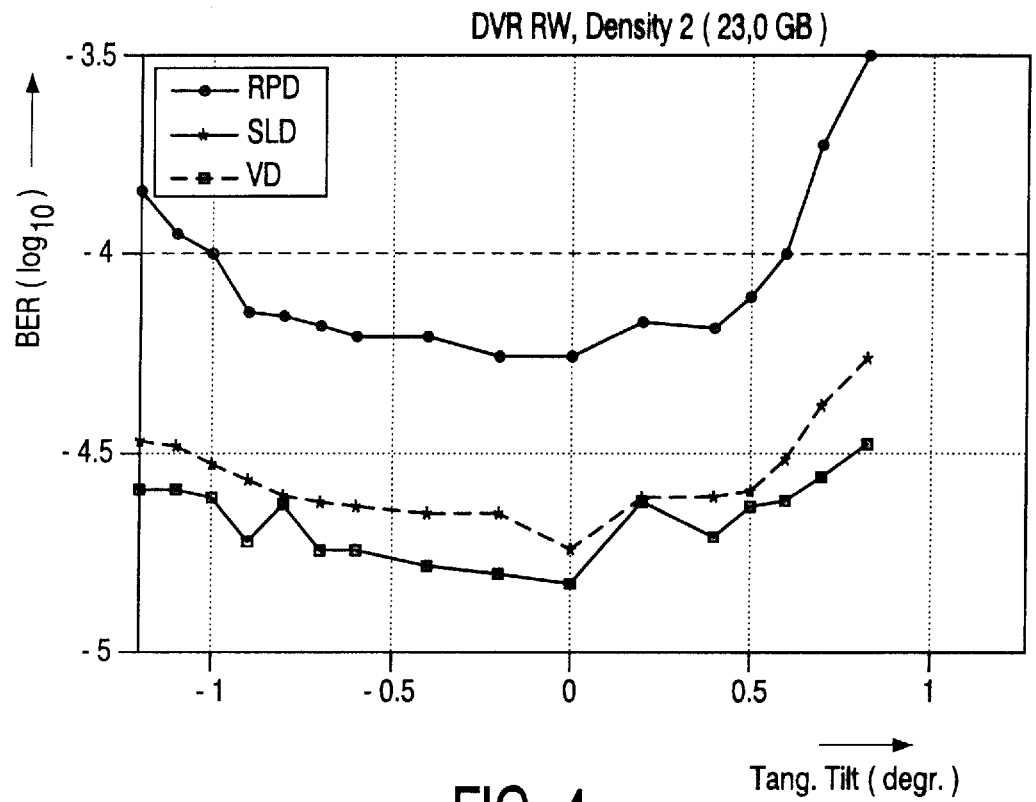
FIG. 4 shows a comparison of the bit error rates for various detection methods including a first embodiment of the method according to the invention as a function of the tangential tilt for a record carrier having a second density.
Figure 5:
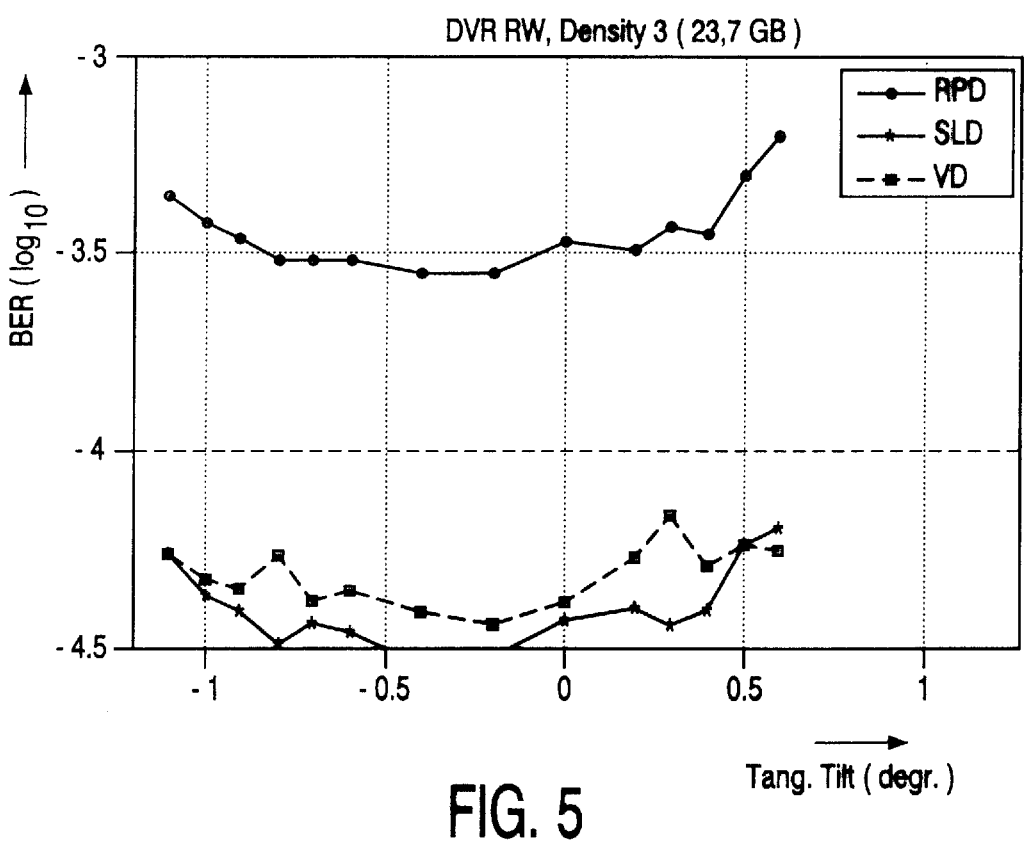
FIG. 5 shows a comparison of the bit error rates for various detection methods including a first embodiment of the method according to the invention as a function of the tangential tilt for a record carrier having a third density.
Figure 6:
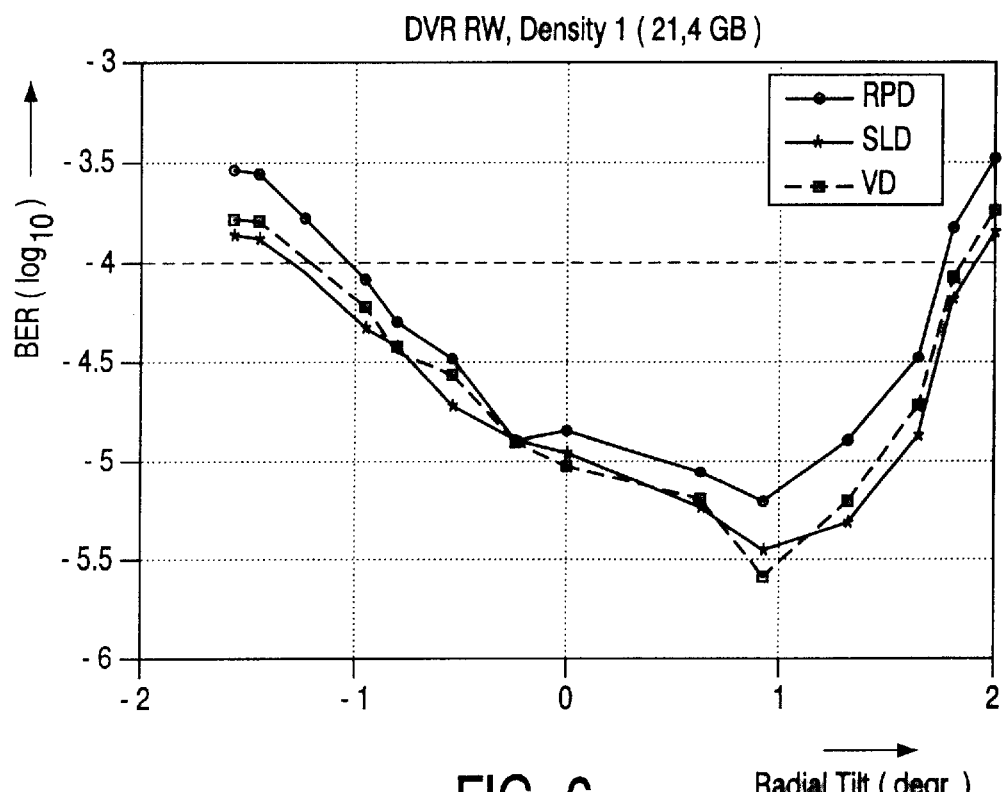
FIG. 6 shows a comparison of the bit error rates for various detection methods including a first embodiment of the method according to the invention as a function of the radial tilt for a record carrier having a first density.
Figure 7:
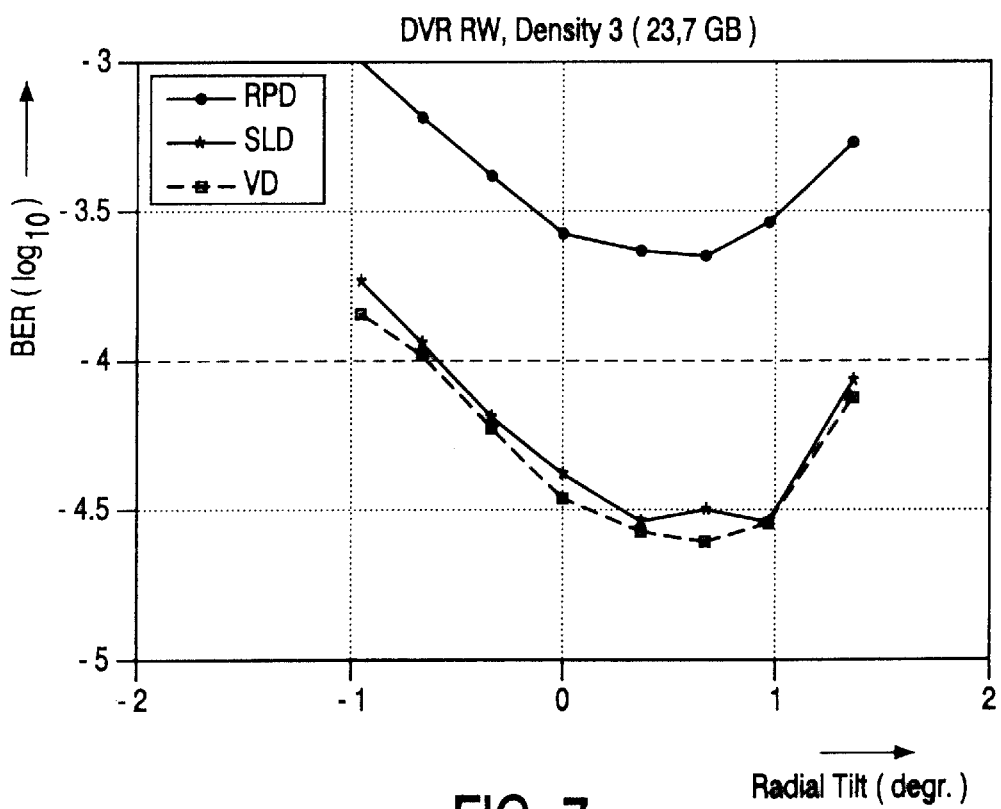
FIG. 7 shows a comparison of the bit error rates for various detection methods including a first embodiment of the method according to the invention as a function of the radial tilt for a record carrier having a third density.
Figure 8:
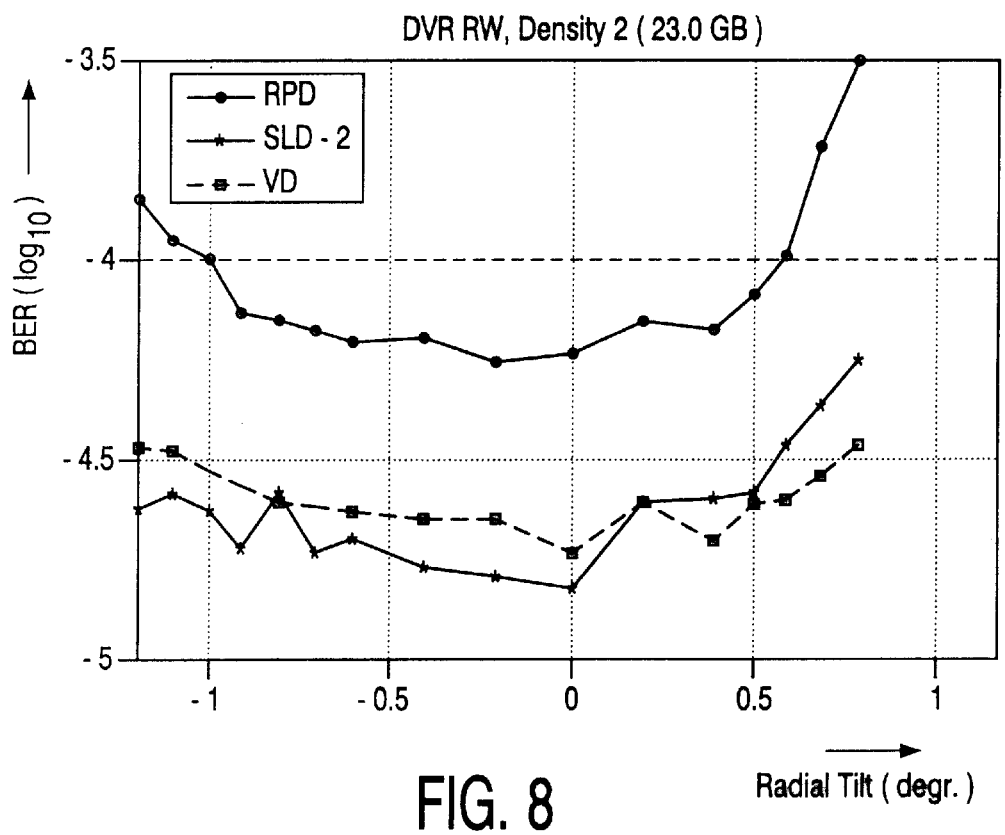
FIG. 8 shows a comparison of the bit error rates for various detection methods including a second embodiment of the method according to the invention as a function of the tangential tilt for a record carrier having a second density.
Figure 9:
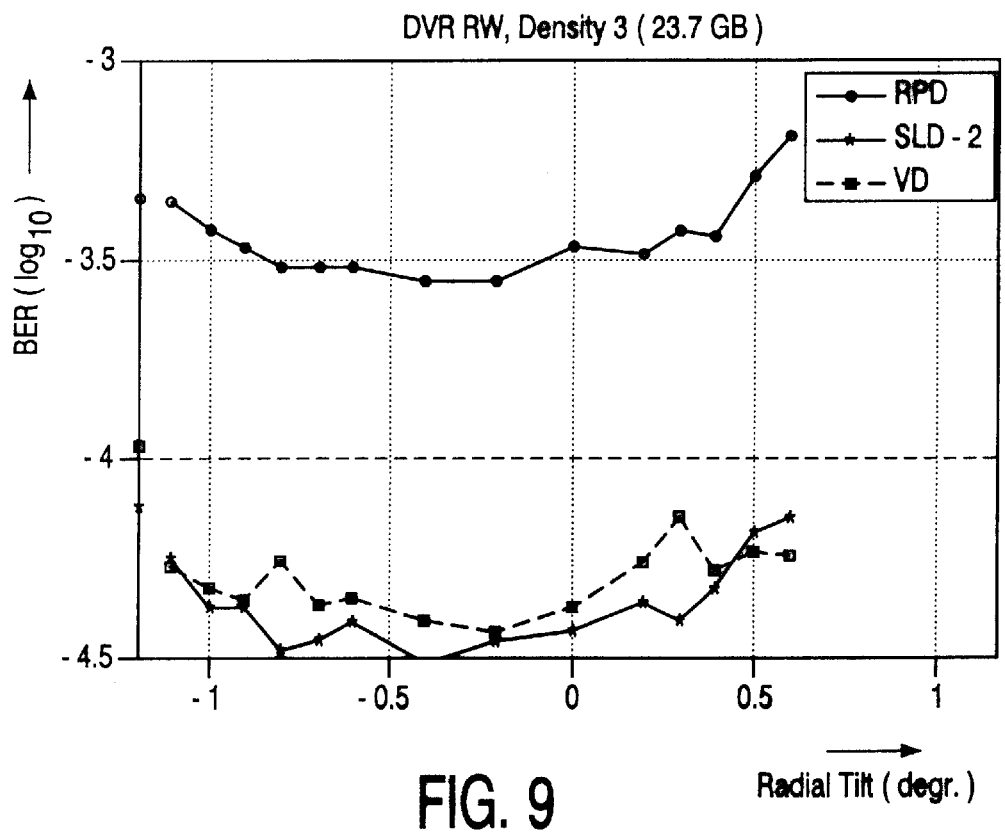
FIG. 9 shows a comparison of the bit error rates for various detection methods including a second embodiment of the method according to the invention as a function of the tangential tilt for a record carrier having a third density.
Figure 10:
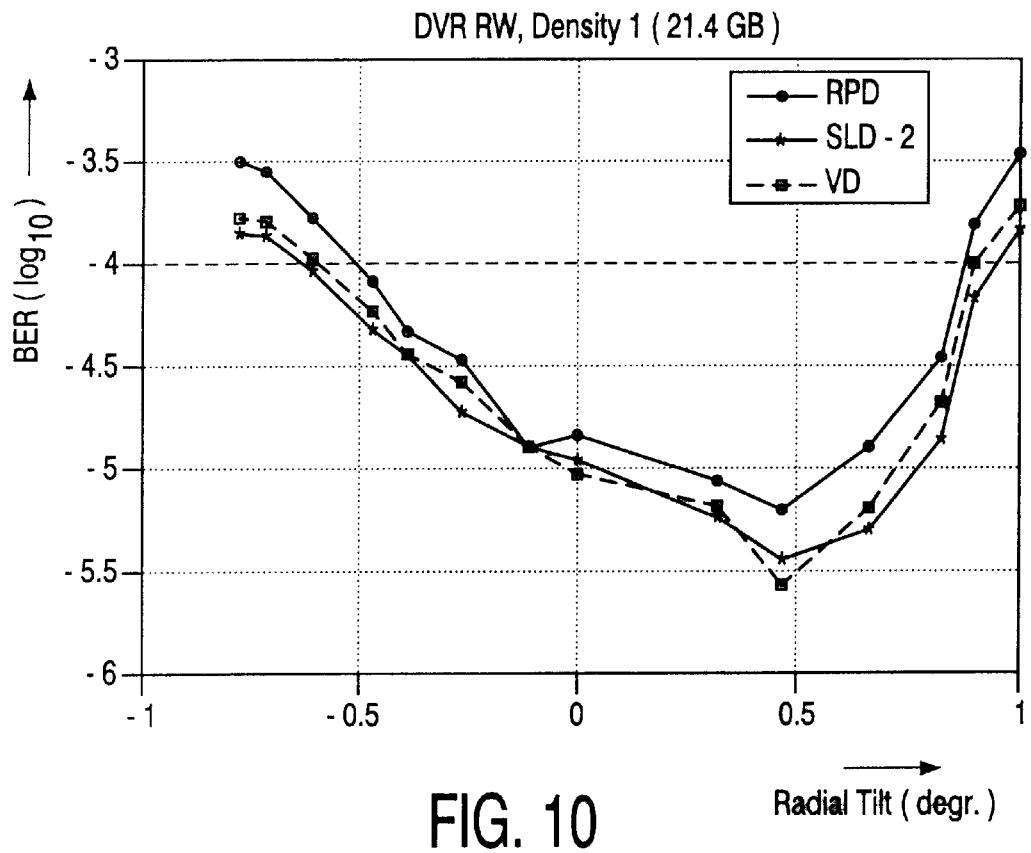
FIG. 10 shows a comparison of the bit error rates for various detection methods including a second embodiment of the method according to the invention as a function of the radial tilt for a record carrier having a first density.
Figure 11:
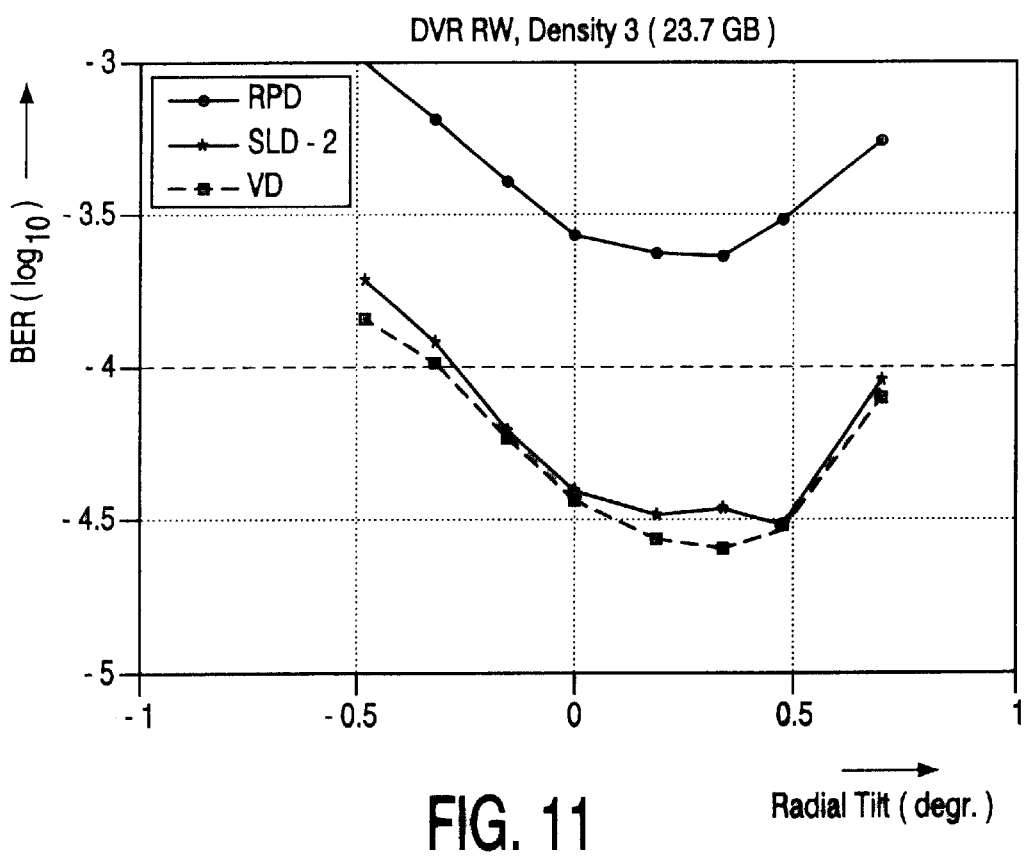
FIG. 11 shows a comparison of the bit error rates for various detection methods including a second embodiment of the method according to the invention as a function of the radial tilt for a record carrier having a third density.
Figure 12:
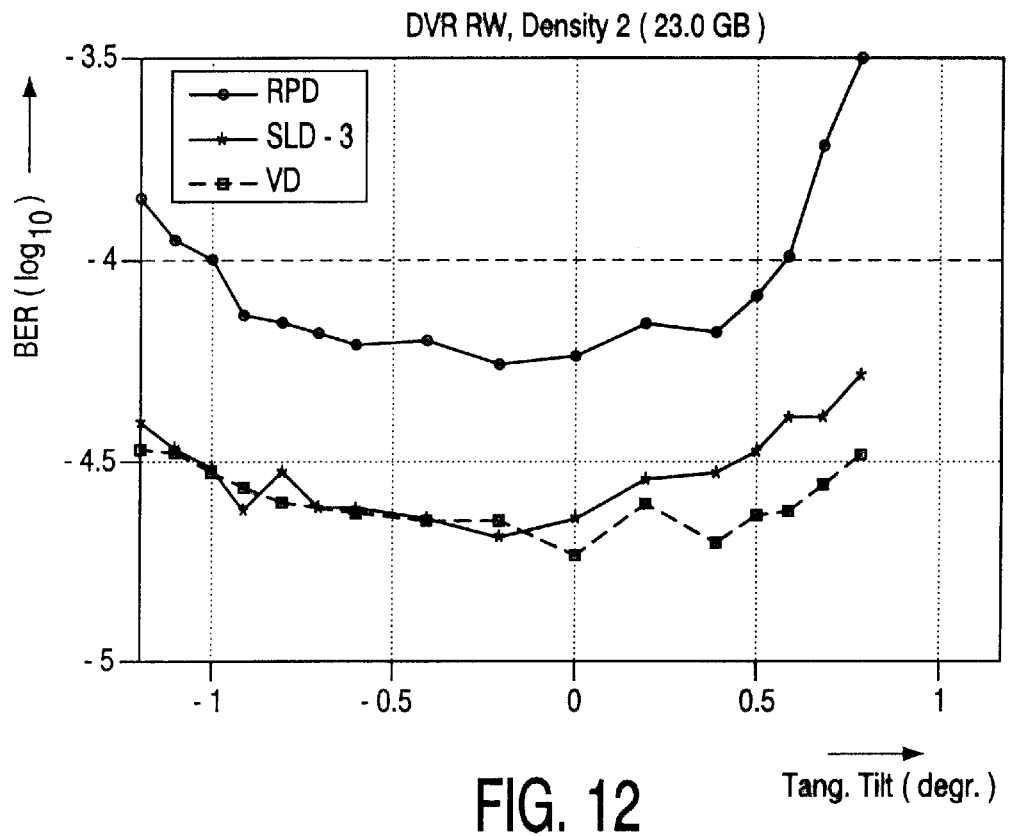
FIG. 12 shows a comparison of the bit error rates for various detection methods including a third embodiment of the method according to the invention as a function of the tangential tilt for a record carrier having a second density.
Figure 13:
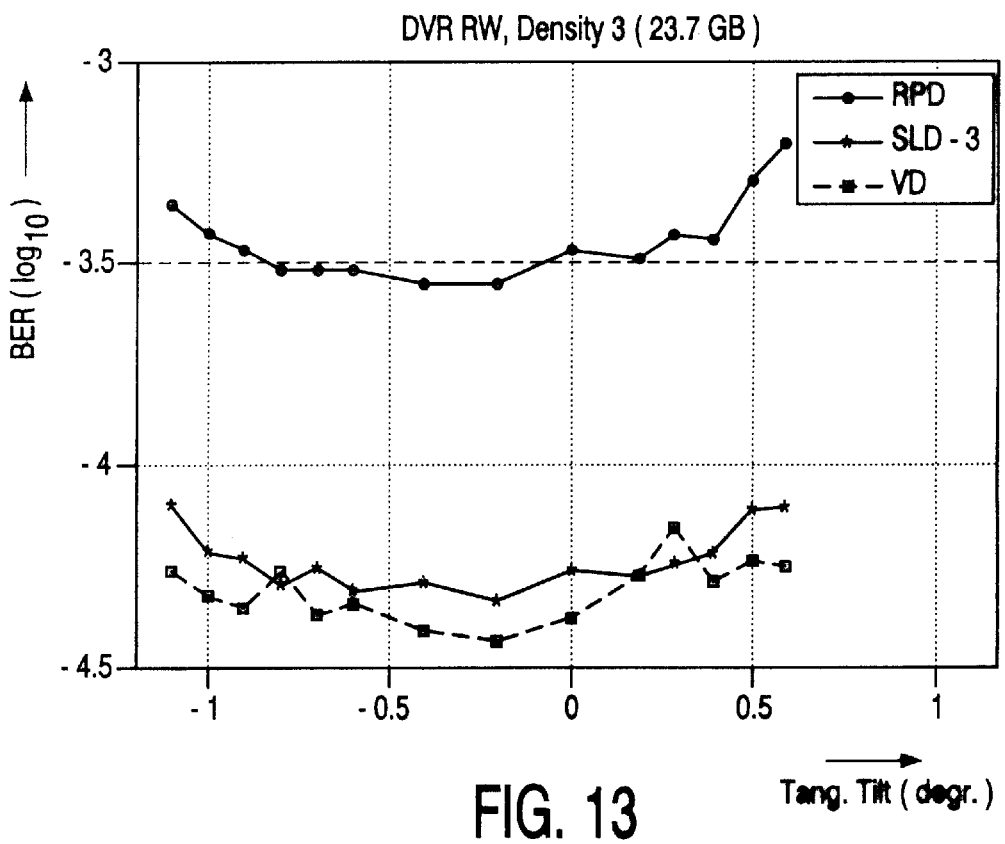
FIG. 13 shows a comparison of the bit error rates for various detection methods including a third embodiment of the method according to the invention as a function of the tangential tilt for a record carrier having a third density.
Figure 14:
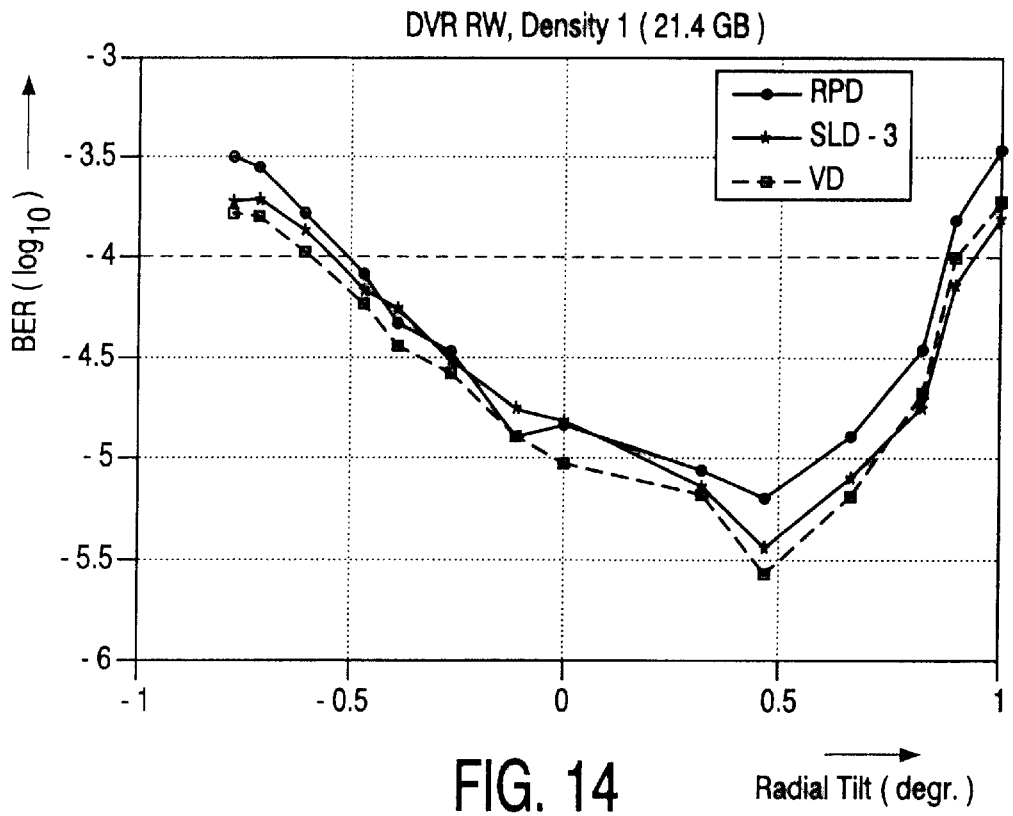
FIG. 14 shows a comparison of the bit error rates for various detection methods including a third embodiment of the method according to the invention as a function of the radial tilt for a record carrier having a first density.
Figure 15:
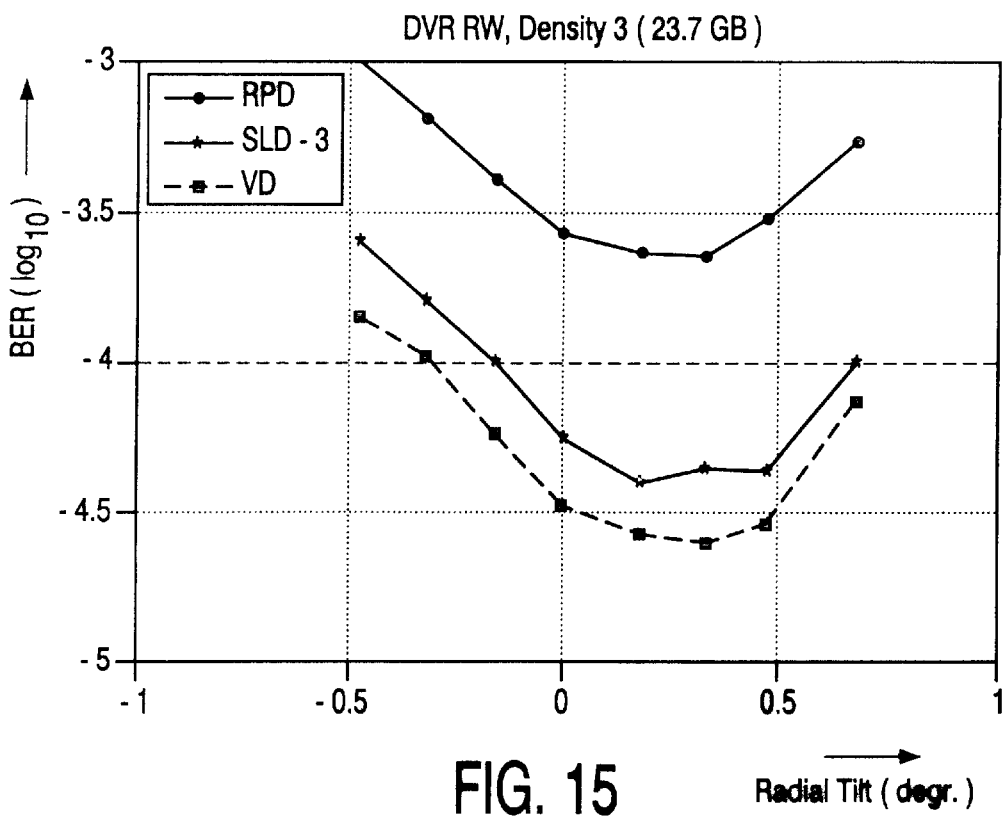
FIG. 15 shows a comparison of the bit error rates for various detection methods including a third embodiment of the method according to the invention as a function of the radial tilt for a record carrier having a third density.

The results for the method according to the first embodiment, in the form of Bit-Error-Rate (logarithmic scale) vs. tangential or radial tilt in degrees, are shown in FIGS. 4, 5, 6 and 7. RPD stands for Runlength Pushback Detector, SLD for Slope Detector (First embodiment), and VD for Viterbi (PRML) Detector. Note that the tilt range in the radial tilt cases (FIGS. 6, 7) is almost double that in the tangential tilt cases (FIGS. 4, 5). In order to provide an absolute level of acceptable performance, a reference BER level of (1e−4) is set, above which detection is deemed unsuccessful.

Similar sets of results are shown in FIGS. 8, 9, 10, 11 for the second embodiment of the method according to the invention (SLD-2), and FIGS. 12, 13 and 14, 15 for the third embodiment of the method according to the invention (SLD-3).

As noted before, the performance degradation of the third embodiment relative to the other two embodiments is traded in for its reduced complexity. The other two embodiments perform quite similarly, with the second embodiment being slightly less complex than the first embodiment. However, all three embodiments are less complex than PRML schemes, and, perhaps more importantly, operate in a feed-forward rather than a bit-recursive way.

All three embodiments of the method according to the invention tested here perform much better than the Runlength Pushback detector, with the margin getting larger at higher densities. Moreover, at least the first and the second embodiment perform as well as the PRML detector, while the third embodiment of the invention stays close. This result is impressive at first glance, however it should be anticipated based on the fact that dominant error patterns are corrected by following the general detection methodology of sub-section 2.3 (see also 2.1). On the other hand, the Runlength Pushback detector proves insufficient in the highest linear density tested, since it never achieves the reference BER level.

As a final note, the generic detector (and all three variants described here) operates in a feed-forward sense through the replay bit-stream, as opposed to the bit-recursive operation of MLSD-type techniques. Therefore, implementation at very high bit rates should not be a problem. This seems especially of importance if the recording density of DVR RW has to be pushed to 24 GB and beyond, at a low cost of hardware and at the same time maintaining the possibility of high-speed writing. The generic detector beats even the simplest PRML detector for d=1 (the transition detector, as described in the earlier filed application PCT/EP00/06975) at the above points. In addition, since near-PRML performance is achieved, the detection methodology proposed here constitutes a good candidate for bit detection in DVR Re-writable.

What is claimed is:

1. Method for converting an analogue signal representing a runlength limited binary signal with runs having a length of at least N into a binary output signal comprising the following steps:
   a. sampling the analogue signal,
   b. generating an intermediary binary signal on the basis of the sampled analogue signal,
   c. identifying binary sequences within the intermediary binary signal having a length greater than 2N−1, the sequences comprising a set of successive samples having the same binary value, and which set borders on samples having an opposite binary value and for each such binary sequence,
   d. selecting an analogue sequence in the sampled analogue input signal which corresponds to the identified binary sequence,
   e. searching for the existence of a plurality of significant local extrema within the selected analogue sequence,
   f. if such a plurality of significant local extrema is found, partitioning the identified binary sequence into a corresponding plurality of smaller runs comprising at least one run of length N.

2. Method according to claim 1, characterized in that the identification in step c identifies a set having a length of at least 2N, and extending that set substantially symmetrical with neighbouring samples until a minimum length of 3N if the length of the binary sequence is less than that minimum length.

3. Method according to claim 1, characterized in that N=2.

4. Method according to claim 1, characterized in that step b involves threshold detection.

5. Method according to claim 1, characterized in that step e comprises
   e1—assigning a polarity to each of the samples in the selected analogue sequence, the polarity being the polarity of the difference between the value of the sample and that of one of the samples bordering on one side,
   e2—identifying samples in the selected sequence for which the assigned polarity differs from the assigned polarity of the sample bordering on the other side,
   e3—if more than one of said samples is identified, selecting the even-numbered identified samples, counting from an outermost identified sample within the selected analogue sequence, and wherein step f comprises changing the binary value within the identified binary sequence for a subset of N successive samples comprising an even-numbered identified sample having an absolute value less than a predetermined value.

6. Method according to claim 1, characterized in that, step e comprises
   e1—selecting a subset of the identified binary sequence in which the outermost samples of the identified binary sequence are excluded,
   e2—sorting the absolute signal values of the sequence of analogue samples in that subset,
   e3—if the smallest absolute signal value is less than a predetermined threshold value then, identifying a subsubset of samples within the subset having the M smallest absolute signal values, wherein M is less than 2N−1, and execute step f, wherein the binary value of at least one sequence of M binary samples comprising the binary samples corresponding to that subsubset is changed.

7. Method according to claim 1, characterized in that step e comprises, comparing the absolute values of the sequence of analogue samples with a predetermined value, the predetermined value lying in a range between a moving average of the analogue signal and the absolute value of the sample in said sequence which is the most deviating from said moving average and in that step f comprises changing the binary value of at least one sequence of binary samples including those samples for which the corresponding absolute value is less than the predetermined value.

8. Method according to claim 1, characterised in that step e comprises, applying runlength pushback detection.

9. Playback apparatus for an optical record carrier, which apparatus comprises a detector which during operation performs a method according to claim 1.

* * * * *